H. J. HOUGHLAND.
FIGURE VELOCIPEDE.
APPLICATION FILED DEC. 23, 1914.
1,193,690.
Patented Aug. 8, 1916.
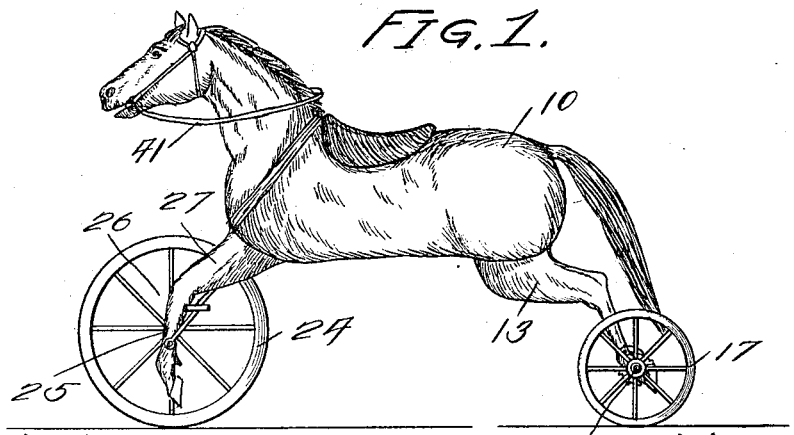
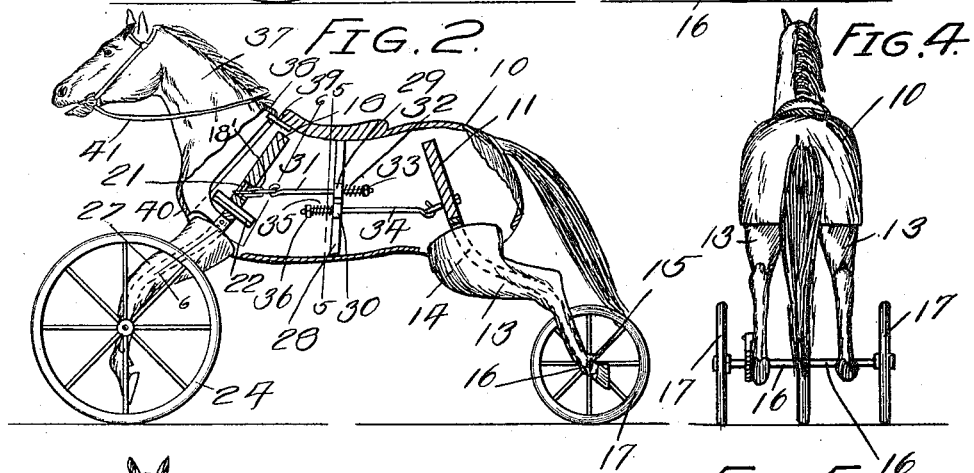
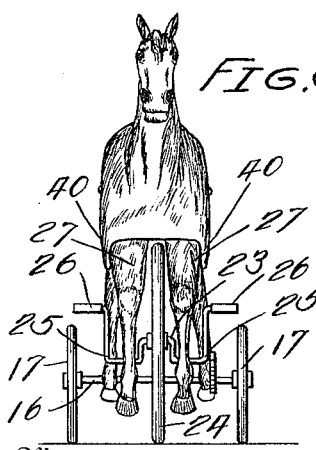
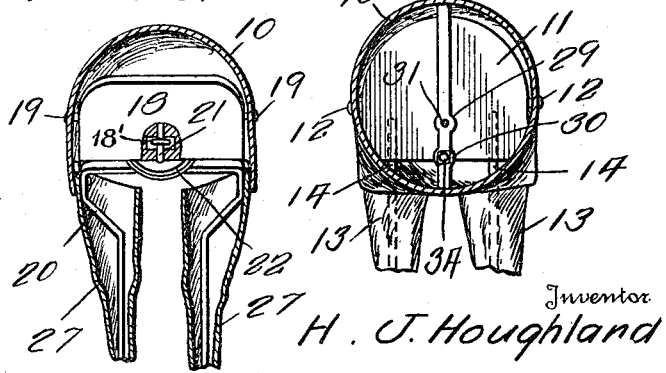
Inventor
H. J. Houghland

UNITED STATES PATENT OFFICE.

HOWARD J. HOUGHLAND, OF TEXAS CITY, TEXAS.

FIGURE VELOCIPEDE.

1,193,690.　　　Specification of Letters Patent.　　Patented Aug. 8, 1916.

Application filed December 23, 1914. Serial No. 878,664.

*To all whom it may concern:*

Be it known that I, HOWARD J. HOUGHLAND, a citizen of the United States, residing at Texas City, in the county of Galveston, State of Texas, have invented certain new and useful Improvements in Figure Velocipedes; and I do hereby declare the following to be a full, clear, and exact description of the invention, such as will enable others skilled in the art to which it appertains to make and use the same.

This invention relates to improvements in velocipedes, and particularly to figure velocipedes.

One object of the invention is to provide a velocipede, the figure of which represents a horse which is capable of being propelled to resemble the galloping of a horse.

Another object is to provide a velocipede which is operated partly by the weight of the rider and partly by pedals.

Another object is to provide a figure velocipede which can be controlled so that the direction of movement of the same can be changed at will.

Other objects and advantages will be apparent from the following description when taken in connection with the accompanying drawings.

In the drawings: Figure 1 is an elevation of a figure velocipede made in accordance with my invention, Fig. 2 is a vertical longitudinal sectional view through the velocipede, Fig. 3 is a front elevation of the same, Fig. 4 is a rear elevation, Fig. 5 is a vertical section on the line 5—5 of Fig. 2, and Fig. 6 is a vertical section on the line 6—6 of Fig. 2.

Referring particularly to the accompanying drawing, 10 represents the figure of a horse which may be formed of any suitable material, but preferably of sheet metal. Disposed in the rear portion of the body of the horse is a vertical block 11 which is arranged to swing on the horizontal trunnions 12 journaled in the sides of the horse's body. Secured to the lower portion of the block, and depending into the hind legs 13 are rods 14, the lower ends of which terminate in suitable bearings 15 in which are mounted the ends of an axle 16, this axle carrying the pair of ground engaging wheels 17. Mounted in the forward part of the body of the horse is a similar block 18 mounted to swing on the horizontal trunnions 19 similarly mounted in the sides of the horse. A front fork 20 has its upper end provided with a vertical king bolt or pin 21 which is suitably journaled in a socket in the lower portion of the block 18. The abutting faces of the fork and block are provided with friction rings 22. These rings and king pin permit the fork to be turned so as to change the direction of movement of the horse. Between the forks is disposed an axle 23 on which is mounted a wheel 24, this axle having depending crank portions 25 on each side thereof, the outer portions of the cranks extending vertically above the shaft where they are provided with laterally projecting pedals 26. Secured to the outsides of the members of the fork 20 are the front legs 27 of the horse, the end portions thereof being pivotally connected with the crank portions 25. Secured to the middle of the body of the horse is a vertical member 28 through which are formed a pair of openings 29 and 30. Pivotally connected to the rear end of a chain 18', which extends into the lower end of the block 18 is a rearwardly extending rod 31, which passes through the upper opening 29. A coil spring 32 is mounted on the rod 31 rearwardly of the member 28, a nut 33 being engaged on the rear end of the rod against which one end of the spring bears. A similar rod 34 is pivotally connected with the lower portion of the block 11 and extends through the lower opening 30 where it is similarly provided with the spring 35 and a nut 36. The forward link of the chain receives the king bolt therethrough, as shown.

The head 37 of the horse is a separate element from the body, and in the upper portion of the neck is a rearwardly extending lug 38 which engages through a slot in a plate 39 pivotally mounted on the forward adjacent end of the back of the horse so that said head will be capable of vertical swinging movement as well as lateral swinging movement. The lower portion of the neck has a pair of rearwardly extending fingers 40 which are secured to the upper ends of the legs 27 so that said head will swing up and down as the front legs raise and lower on the crank members 25 and at the same time be permitted a lateral swinging movement on the pivot pin 21.

The springs 32 and 35 normally exert pull on the rods 31 and 34 so as to draw the front and rear legs toward each other but when the child is placed on the horse, his weight will cause the legs to spread toward the front and rear as will be readily understood.

The feet of the child will be placed on the pedals 26, and by properly operating the pedals the cranks 25 will be turned around the shaft 23 causing the wheel 24 to turn and move the horse forwardly. The cranks will cause the front legs to move up and down as will be understood. When forward pressure is exerted on the pedals the horse is relieved of the greater part of the weight of the rider, thus permitting the spring 35 to draw the rear legs forwardly, and then when the pedals are down, the weight is restored to the horse causing the front legs to swing forwardly thus first the hind legs are drawn forwardly, then the front legs, while at the same time the rear legs are held approximately stationary. This will give the appearance of a galloping horse.

The head is provided with reins 41 and by means of these reins the head can be turned from one side to the other so as to swing the front wheel 24 and steer the horse in any direction desired. It will also be noted that as the front legs move up and down on the cranks 25 the head will bob up and down simultaneously.

What is claimed is:

1. A velocipede comprising the figure of a horse, blocks pivotally mounted interiorly of the body of the figure adjacent the front and rear thereof, each block having a pair of legs associated therewith, a vertical member arranged between the blocks, means yieldably connecting the blocks and member to cause the legs to move toward each other after being moved away from each other.

2. A velocipede comprising a figure of a horse, blocks pivotally mounted interiorly of the body of the figure and at each end thereof, a vertical member in the body and disposed between said blocks, rods having their outer ends connected with the blocks and their inner ends slidably and yieldably connected to the member, hind legs rigidly associated with the rear block, an axle supported by said legs, wheels for the axle, front legs having a fork fixed thereto, said fork being pivotally engaged with the front block, a pedal shaft engaged with the front legs and fork, a wheel fixed to the shaft, the neck portion of the body having a part pivotally connected to the body and a part rigidly connected to the front legs, as and for the purpose set forth.

In testimony whereof, I affix my signature, in the presence of two witnesses.

HOWARD J. HOUGHLAND.

Witnesses:
GEORGE F. MIZEN,
JOHN SCHMIDT, Jr.

Copies of this patent may be obtained for five cents each, by addressing the "Commissioner of Patents, Washington, D. C."